INVENTORS.
ANTHONY GERHARD FAURE &
CARL AKE GRAHN
BY

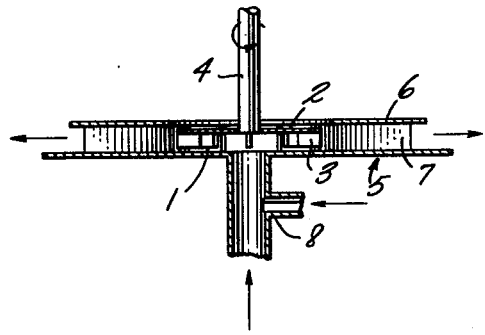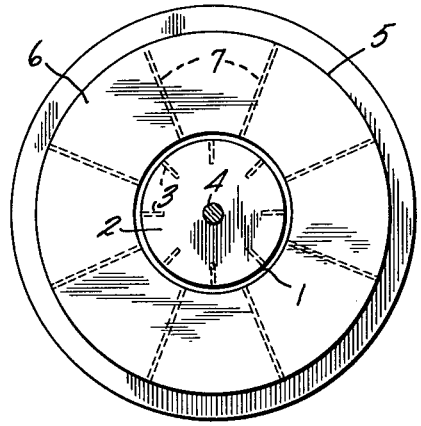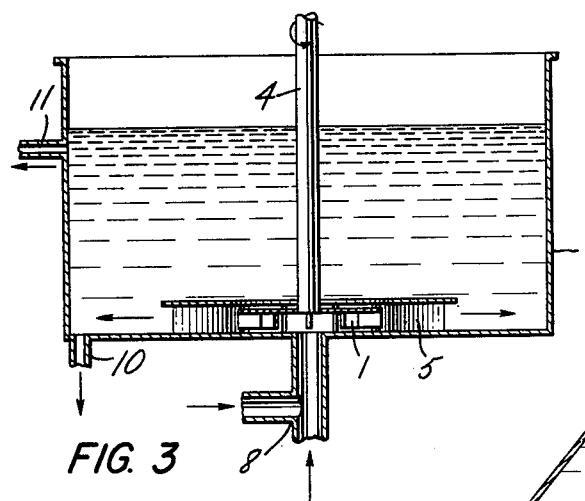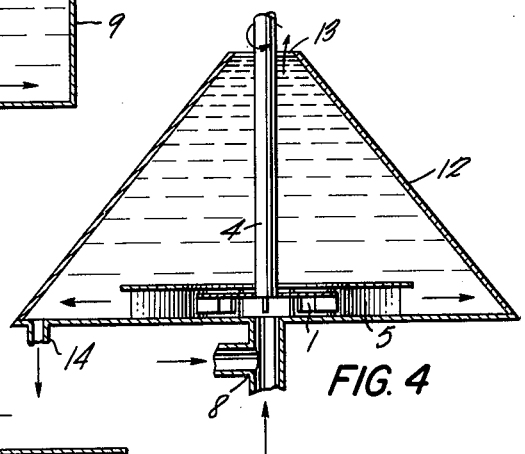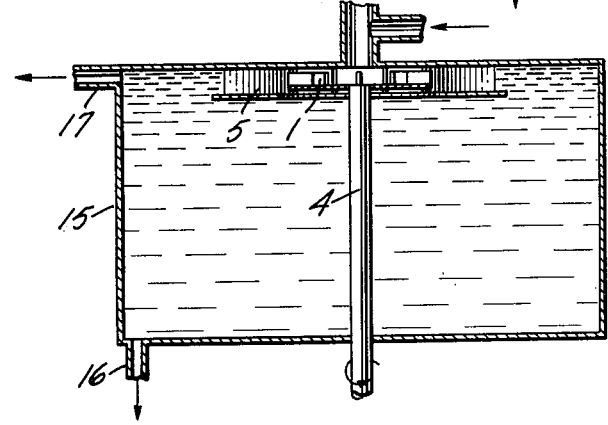
INVENTORS.
ANTHONY GERHARD FAURE &
CARL AKE GRAHN
ATTORNEYS

ATTORNEYS

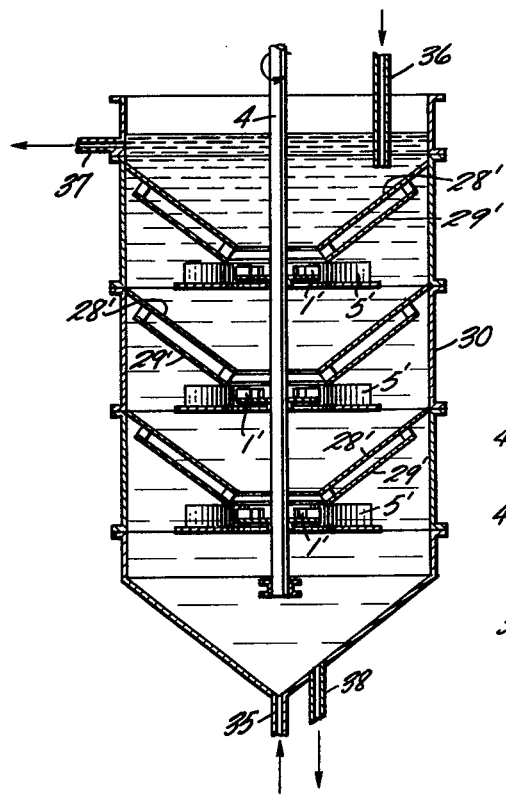
FIG. 11
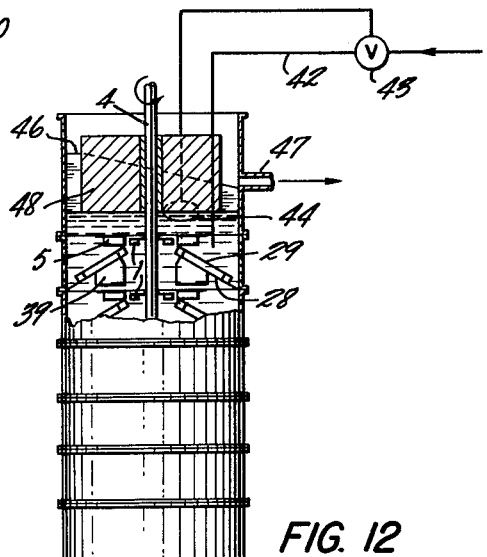
FIG. 12
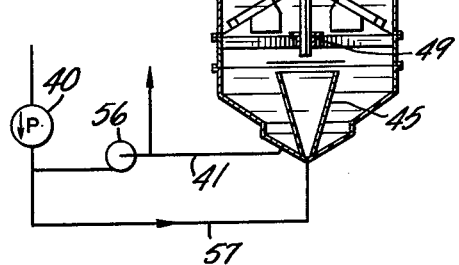
INVENTORS.
ANTHONY GERHARD FAURE &
CARL AKE GRAHN
BY
ATTORNEYS

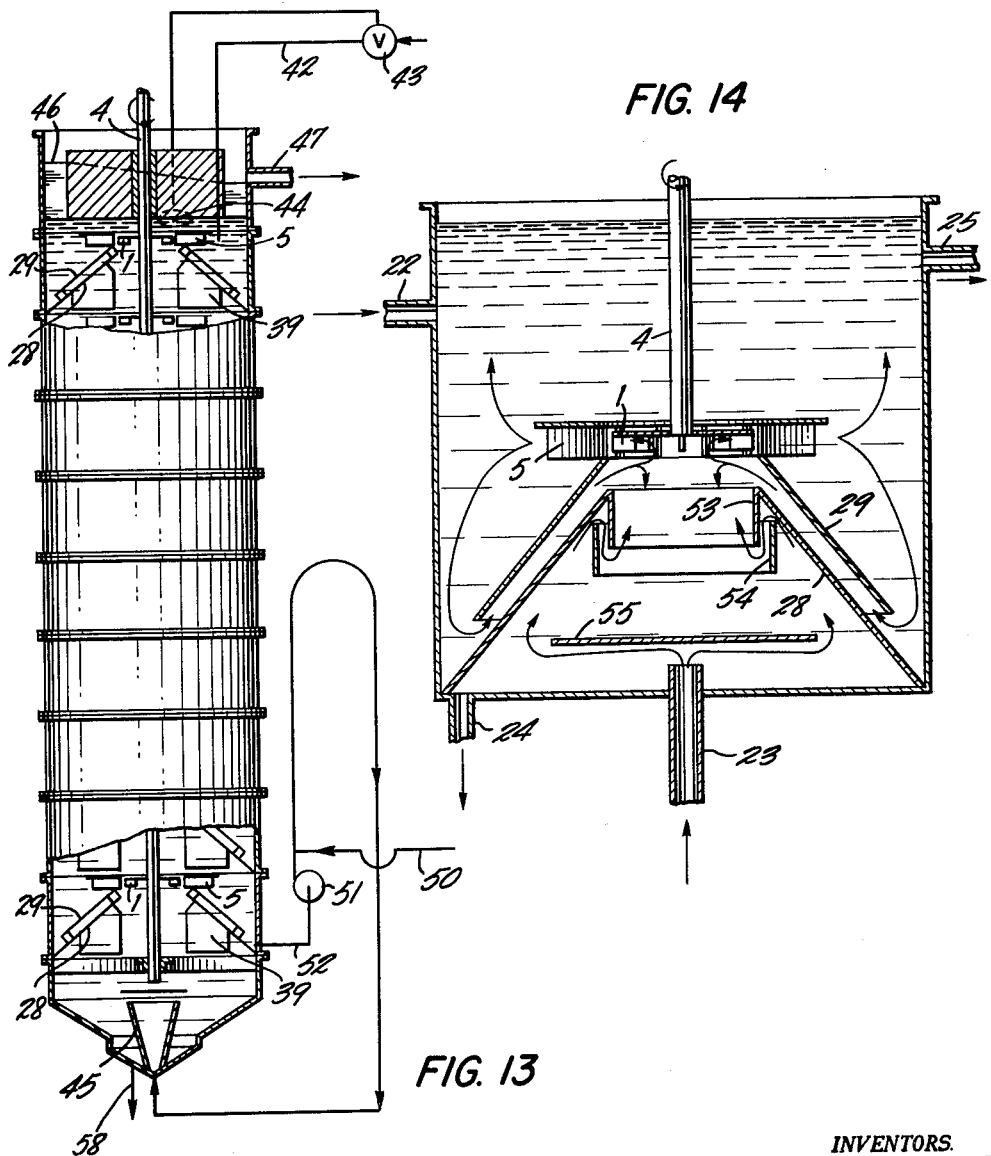

United States Patent Office 3,233,876
Patented Feb. 8, 1966

3,233,876
APPARATUS FOR CONTACTING PHASES OF DIFFERENT DENSITIES
Anthony Gerhard Faure, Zwijndrecht, Netherlands, and Carl Ake Grahn, Oxelosund, Sweden, assignors to Lever Brothers Company, New York, N.Y., a corporation of Maine
Original application Nov. 18, 1960, Ser. No. 70,203. Divided and this application Apr. 29, 1964, Ser. No. 363,376
5 Claims. (Cl. 259—96)

This application is a division of Serial No. 70,203 filed November 18, 1960 and now abandoned.

This invention relates to an apparatus for and a method of contacting two phases and in particular phases of different density, which are immiscible or only slightly miscible and of which at least one is in dispersed state.

It is an object of the present invention to provide new and improved apparatus for contacting and separating phases of different density. These and other objects of the present invention will become apparent as the description proceeds.

It is known to contact two liquid phases by continuously mixing one phase with a quantity of the other and to separate the mixture.

Such a process is frequently carried out in a number of counter-current stages, one of the separated phases being transferred to the preceding stage and the other to the following stage.

It has now been found:

(1) That when extracting a substance from one liquid phase by another liquid phase, immiscible in the first and of different density, efficient mixing enabling the equilibrium distribution of the transfer substance between the two liquids to be reached or closely approached, can be obtained by causing the two liquids to flow through a rotor which is rotated rapidly and a diffuser which is coplanar with the rotor, the rotor preferably consisting of a plate provided with a plurality of vanes, and the diffuser preferably consisting of a stationary circular plate having a central hole slightly larger than the rotor and being provided with a plurality of vanes.

(2) That the flow of the liquid mixture leaving the diffuser can, by suitable choice of the rotor speed and diffuser dimensions, be obtained in a radial direction and at low flow rates.

(3) That for a more than adequate mixing intensity, the outward flow from the rotor-diffuser is so slow that even if this unit is placed in a tank of surprisingly small diameter and height, a calm zone is formed just above the level of the rotor-diffuser in which the two phases will separate by their difference in gravity.

(4) That in such a tank the heavier liquid phase after separation from the lighter liquid, can be recirculated at surprisingly high rates without distrubing the relatively calm zone, if a path between two conical plates is provided for it to flow into the suction side of the rotor.

Thus according to one aspect of the present invention there is provided an apparatus for mixing and separating two phases of different density which are immiscible or only slightly miscible, which apparatus comprises a rotor arranged to rotate in a co-planar stationary diffuser.

The essential features of the rotor are that it acts as a pump or fan, and that it distributes its output evenly from its circumference.

The rotor diffuser combination gives good mixing without causing excessive flow or turbulence in the separation stage. For some applications it may be desirable to design the rotor so as to give high turbulence inside the rotor, e.g. by means of a labyrinth of baffles. The function of the diffuser is to complement the mixing of the phases in the rotor by creating a high turbulence in the mixer at the inlet and to smooth and slow down the flow of mixture from the rotor so that the components can separate in the separation zone.

Preferably the rotor is made of a circular plate to which a plurality of vanes are attached, whilst the diffuser is made of a circular plate with a central hole slightly larger than the circular rotor to which a plurality of vanes are attached. Preferably the rotor and diffuser have 4–12 vanes and each vane is preferably in the form of a fin parallel to the axis.

The diffuser vanes are situated as near as possible to the rotor so that the turbulence is limited as far as possible to the material within the rotor and diffuser and that the direction of tangential flow of material from the circumference of the rotor is changed to a radial flow so that the mass of material in the tank is not put into a circular motion.

In case re-circulation of one of the phases is desirable so as to allow equilibrium to be established more closely between the phases to be mixed, the rotor diffuser unit may be placed in the bulk of the contents of the tank. The re-circulation rate can be increased by providing baffles which are preferably conical to give a more appropriate arrangement for the entry and withdrawal of materials without distrubing the flow pattern. We have found that it is possible to pass considerable quantities of the light phase upwards through the hole in the baffle at the same time as the heavier phase passes downwards. In order to get good control and high re-circulation rates it is preferred to use two coaxial conical baffles. Such an arrangement is especially advantageous if more than one rotor diffuser unit is placed in a tank to form a multi-stage counter-current liquid extraction unit. In that case, of course, each rotor diffuser unit should be provided with its own double cone system.

By suitable choice of rotor speed and of the design of rotor and diffuser, the intensity and duration of the turbulent mixing can be varied over a wide range, as well as the rate of re-cycling of the continuous phase. The separation step is carried out in such a way that it is largely independent of the mixing process. Separation, however, is carried out in a calm zone and has to be rapid, which requires the calm zone to be kept as free as possible from turbulence and flow. The output of the rotor, therefore, whilst it may vary within wide limits and may be very large, must not be excessive.

The speed of the rotor lies preferably in the range from about 60 to about 200 r.p.m.

The double cone system in each unit is so arranged that the heavier continuous phase in the normal apparatus has to follow the zig-zag path formed by the upper cone not fully extending to the wall. A portion of this path passes just below the rotor, so that a considerable part of the heavier phase entering the suction side of the rotor is recirculated with the upwards flowing lighter phase.

The portion of heavier liquid recycled is dependent on the rotor-speed and the rate at which the lighter liquid flows through the apparatus. The portion of heavier liquid which is continuously recycled may be made as high as 40 times the amount of lighter liquid flowing through the unit. This is of great advantage if the desired throughput of the heavy phase in relation to the throughput of the light phase is small, as even under such conditions high efficiency is reached.

It is preferred that the diameter of the rotor is bigger than the internal diameter of the cones. In practice it might, however, be of advantage to have the diameter of the rotor slightly smaller than that of the cones, as this arrangement facilitates the assembling and disassembling of the apparatus.

The angle of the cones should be such that the lighter phase moves freely upwards, but not so big that the volume or height of a section may become inconveniently large. An inclusive angle between the conical plate and the axis of the rotor of from about 100° to about 150° is preferred.

Vertical radial baffle plates can be fixed to the lower cones. These may extend almost from the shaft to the walls of the tank, or only part of this distance. They may project downwards from the cones to the circular horizontal diffuser plate, or only part of this distance. Usually not more than three or four of these plates are needed to stop the rotation of the mass of material in the section.

To provide an interstage resting time for components for which it is desired to give a better settling by allowing them to separate into two layers, a vertical cylindrical baffle system may be installed. This baffle system, which is preferably fixed to the lower cone, comprises two cylinders coaxial with the shaft and of unequal diameter. The cylindrical baffle with the smaller diameter has its upper end at the inner end of the lower cone so as to prevent or restrict material from passing between it and the cone. The cylindrical baffle with the larger diameter is placed at a small distance from the lower cone so as to allow material to pass freely between it and that cone. The lower ends of both cylindrical baffles are above the lower end of the lower cone. The lower end of the inner cylindrical baffle is below—preferably about 10 cms. below—the upper end of the outer cylindrical baffle, and above—preferably about 5–10 cms. above—the lower end of the outer cylindrical baffle.

The ratio of the height of a unit to its internal diameter is preferably about 1:2 to 1:5.

The number of units to be chosen depends on several economic factors, such as the amount of investment for an extra section, the value of the material extracted and the cost of recovering the extracted material from one of the phases. Generally between 10 and 16 units are preferred, but smaller as well as greater numbers are possible. In case e.g. the material to be transferred from the one phase to the other tends to distribute itself in such a way that the concentration in the transfer material in the second phase when in equilibrium with the first phase is very high, e.g. five or more times as high, then only a small number of units, e.g. three, may be needed to obtain a substantial removal of the transfer material from the other phase. In case a greater overall extraction of the transfer material is required at a given low phase ratio, the number of units has to be increased. In this way a decrease in phase ratio is compensated by an increase in the number of units.

In view of the high efficiency per unit of the transfer process in the apparatus according to the invention, it is possible to remove transfer material almost completely from one phase at even very low phase ratios.

This form of the apparatus is especially applicable to the transfer of material from one phase to another. Normally the heavier phase must be liquid; this phase is the continuous phase during the mixing step and is continuously recycled. The lighter phase is the dispersed phase and may be a liquid, a slurry, a finely divided solid or a gas or foam.

Another form of the apparatus is the normal form above inverted. When using this inverted apparatus, the lighter phase must be continuous and a liquid and is continuously recycled. The heavier phase may be liquid, a slurry or a finely divided solid. The inverted apparatus will also function, of course, if the continuous phase is a gas or foam and the rotor is a fan of a construction similar to that of the pump wheel of the normal apparatus.

It is clear that the continuous phase or the dispersed phase, or both, may be mixtures, as long as the differences in density between the components in these mixtures are small as compared with the differences in density between the continuous and the dispersed phases. Examples of processes which may be carried out in the apparatus according to the invention are the purification of soap by washing with niger, the washing of soap with brine, the neutralization of alkali in lyes with fat, the extraction of fat and oil from seeds, the deordorization of fat, the liberation of fat from spent bleaching earth, the high-pressure splitting of fats with water, the splitting of soap with acid, and other extraction processes, as well as certain heat exchange applications.

The invention will now be described with reference to the accompanying drawings in which:

FIG. 1 shows a cross-section of a rotor-diffuser unit;

FIG. 2 shows a plan view of the unit shown in FIG. 1;

FIG. 3 shows a cross-section of a rotor diffuser unit and associated tank;

FIG. 4 shows a cross-section of an alternative arrangement similar to FIG. 3;

FIG. 5 shows a cross-section of an alternative arrangement similar to FIG. 3;

FIG. 11 shows a cross-section of an alternative arrangement of a multi-stage unit with conical baffles;

FIG. 12 shows a cross-section of a modified form of the apparatus shown in FIG. 10 arranged for the countercurrent washing of soap with brine;

FIG. 13 shows a cross-section of the apparatus shown in FIG. 12 arranged for the neutralization of caustic soda in alkaline spent washing lye by means of fat, and FIG. 14 shows a cross-section of an arrangement having both conical and cylindrical baffles.

Figure 6:
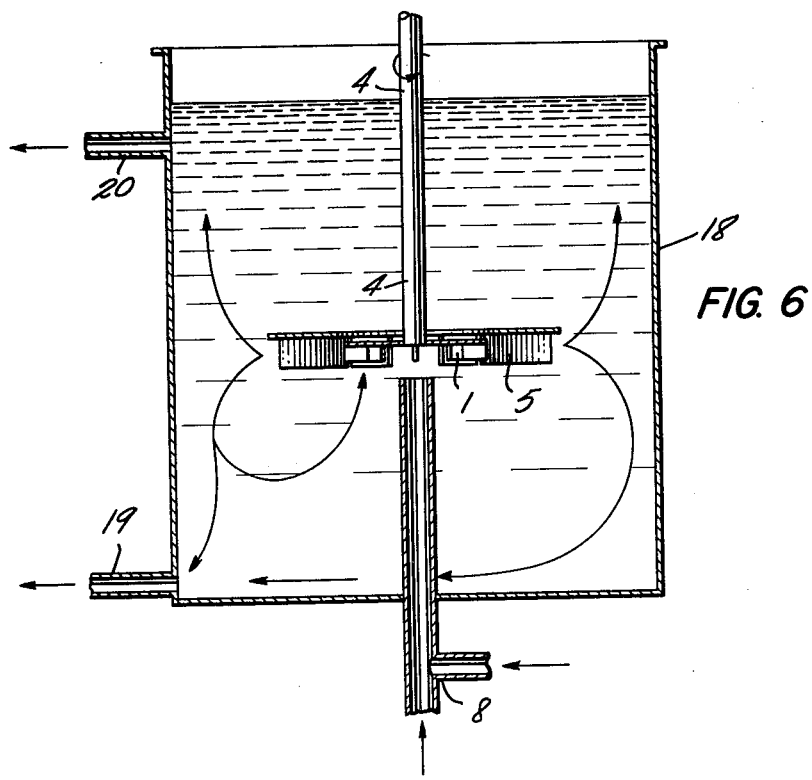
FIG. 6 shows a cross-section of an alternative arrangement similar to FIG. 3.

Referring to FIGS. 1 and 2, the rotor 1 is constituted by a flat circular plate 2 having eight vanes in the form of fins 3 fastened to the underside of the plate. The rotor is mounted on a shaft 4. The fins 3 are disposed regularly and parallel to the axis of rotation. The diffuser 5 is constituted by an annular plate 6 having eight depending vanes in the form of fins 7. The fins 7 are disposed regularly and parallel to the axis of rotation. The two phases flow to the center of the rotor through an inlet pipe 8, the direction of each phase being shown by one of the lower arrows. The outlet flow is radial as shown by the upper arrows. Such a rotor diffuser inlet is very suitable for a one stage contacting apparatus, in which a high turbulence in the flow of fluid through it is desired, whilst the radial outflow is smooth.

The rotor-diffuser unit shown in FIGS. 1 and 2 may be placed in a tank of circular cross-section to continuously mix and separate two phases. In the arrangement shown in FIG. 3, the rotor-diffuser unit is placed centrally at the bottom of a tank 9. The two phases enter through the branched inlet pipe 8 and the resulting mixture is thrown to the wall of the tank. The heavier and lighter phase leave the tank through outlet pipes 10 and 11 respectively.

In the embodiment shown in FIG. 4, the rotor-diffuser unit is placed centrally at the bottom of a conical tank 12. In the arrangement, the lighter phase leaves the tank through an orifice 13 at the apex and the heavier phase leaves the tank through an outlet pipe 14.

In the embodiment shown in FIG. 5, the rotor diffuser unit is located centrally at the top of a circular tank 15. The heavier and lighter phase leave the tank through outlet pipes 16 and 17 respectively.

In the embodiment shown in FIG. 6, the rotor-diffuser unit is placed in tank 18 of circular cross-section about halfway up its axis. The two phases are supplied to the rotor through the branched inlet pipe 8 and the heavy and light phase leave the tank through outlet pipes 19 and 20 respectively. The flow pattern inside the tank has been indicated by arrows.

Figure 7:
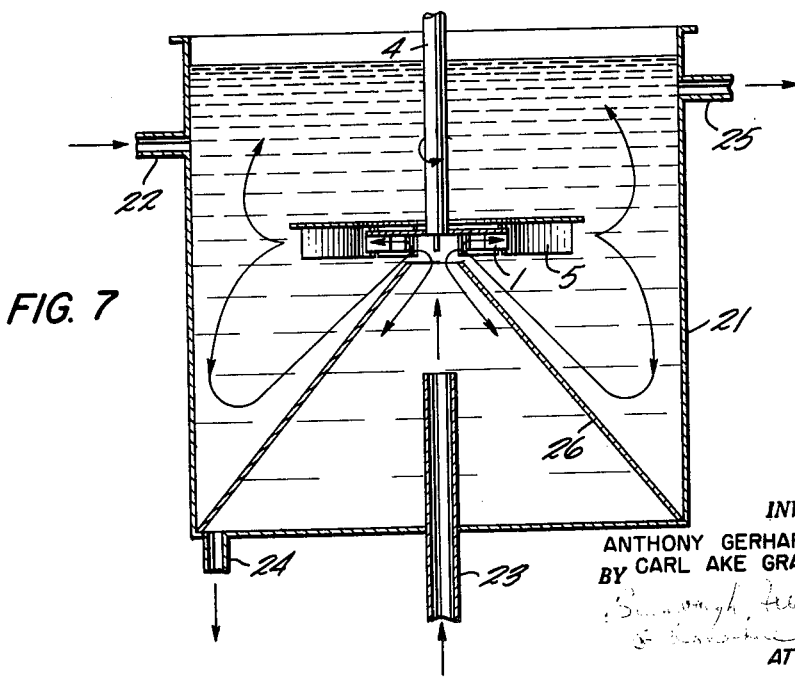
FIG. 7 shows a cross-section of an alternative arrangement similar to FIG. 3 having a conical baffle.

In the embodiment shown in FIG. 7, the rotor diffuser is placed in a tank 21 of circular cross-section about halfway up its axis. The heavy phase enters the tank through inlet pipe 22 and the light phase through inlet pipe 23. After mixing and separation, the heavy phase leaves the tank through outlet pipe 24 and the lighter phase through outlet pipe 25, which is situated above the inlet pipe 22. A conical guide or baffle 26 is located concentric with the rotor. Its upper open end is situated just below and has a smaller diameter than the rotor inlet. Its other end terminates at the junction of the bottom and side of the tank. In operation, the light and heavy phase pass to the rotor inlet. The light phase, after separation rises through a layer of the mixture and leaves through outlet pipe 25, though some of it may be entrapped by the heavy phase entering through inlet pipe 22 and be recirculated. The heavy phase after separation is sucked by the rotor up the outer face of the cone, then flows over the orifice into the cone and is removed through outlet pipe 24. It will be noted that part of the heavy phase will be recirculated and that further contacting takes place in the neighborhood of the orifice constituting the upper open end of the cone. This is due to the fact that considerable quantities of the light phase pass upwards through the orifice at the same time as the separated heavy phase passes through it downwards. The direction of flow is indicated by the arrows.

Figure 8:
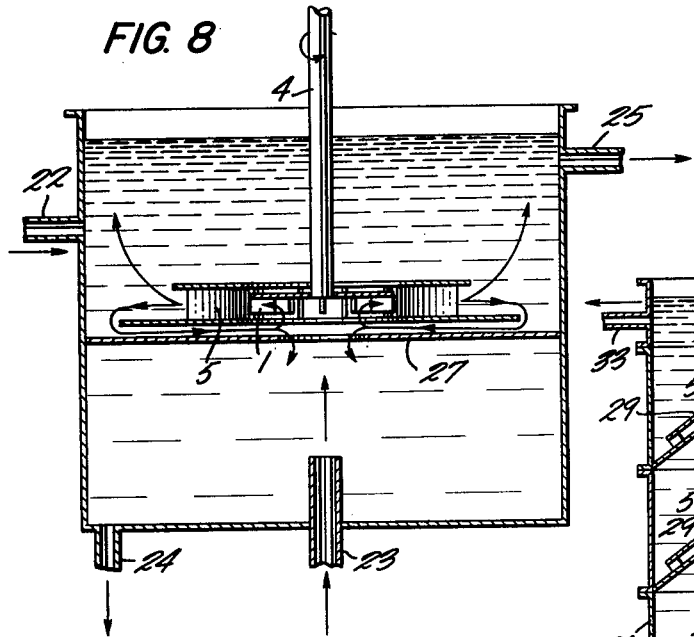
FIG. 8 shows a cross-section of an alternative arrangement similar to FIG. 3 having a flat annular baffle.

FIG. 8 shows an embodiment similar to that shown in FIG. 7 except that a circular guide plate 27, situated at right angles to the axis of rotation slightly below the rotor-diffuser unit, is provided instead of the conical baffle 26.

Figure 9:
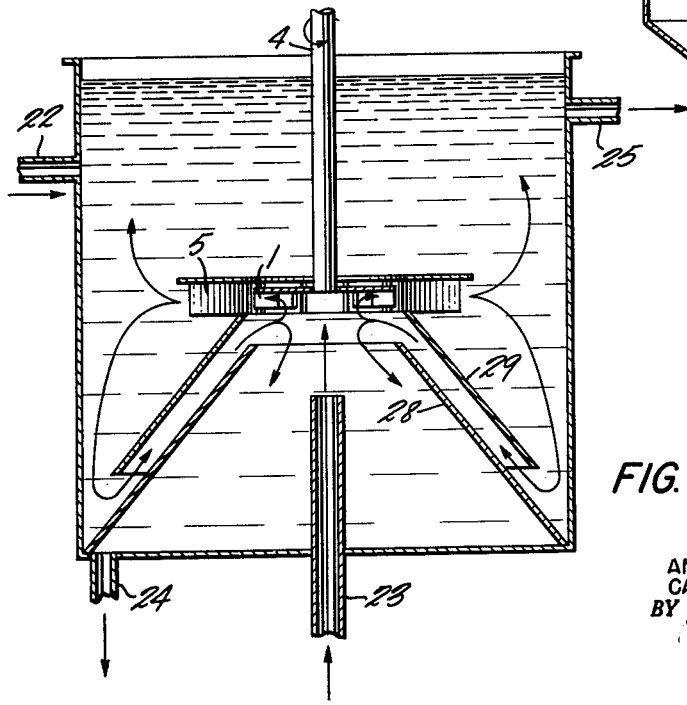
FIG. 9 shows a cross-section of an alternative arrangement similar to FIG. 7 having two coaxial conical baffles.

The embodiment shown in FIG. 9 is similar to that shown in FIG. 7 except that two coaxial conical baffles are used. The lower conical baffle 28 extends to the wall of the tank whereas the upper conical baffle 29 does not extend to the wall of the tank. Such a double cone system gives better flow control and enables higher recirculation ratios to be attained.

Rotor-diffuser systems with double conical baffles are, by virtue of their good flow control characteristics, particularly suitable for use in a multi-stage unit. The multi-stage counter-current liquid extraction unit shown in FIG. 10 comprises a circular tank 30 having three superimposed sections each of which has a rotor-diffuser and conical baffle system of the type shown in FIG. 9. The light and heavy phase flow in at 31 and 32 respectively and flow out at 33 and 34 respectively.

The lower of the two conical baffles in each section guides the light liquid in the section below through the aperture in its apex into the suction side of the rotor, the same aperature also providing the path for the heavy liquid to flow from one section to the next lower section. It was found that the lighter liquid did not always need to separate from the heavier liquid in a layer before flowing into the next upper section but that it could be made to flow upwards into the next upper section by the action of gravity as small droplets moving upwards independent of the continuous phase surrounding them, and against the downward flow of the heavier phase from the section above.

The embodiment described allows processes to be carried out which requires a very high degree of extraction at a low phase ratio. Moreover, it is not only applicable to liquids; although the heavier of the two phases is preferably liquid and continuous, the lighter phase, which is the disperse phase, need not be a liquid but may also be a finely divided solid or a gas.

Figure 10:
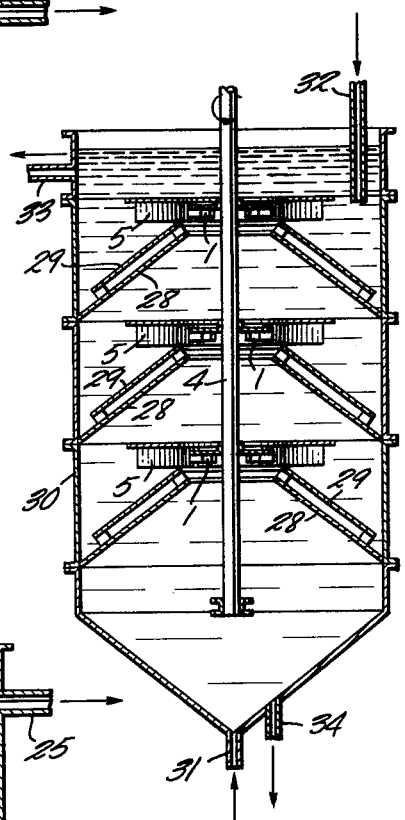
FIG. 10 shows a cross-section of a multi-stage unit with conical baffles.

The embodiment shown in FIG. 11 is similar to that of FIG. 10 except that the rotor-diffuser unit 1' and 5' and the conical baffles 28' and 29' are inverted. In this embodiment, the light and heavy phase flow in at 35 and 36, respectively, and flow out at 37 and 38, respectively.

The embodiment shown in FIG. 12 is a ten-stage counter-current apparatus. Each section comprises a rotor 1, diffuser 5 and double conical baffle 28 and 29 as described previously. Radial baffle plates 39 are attached to the lower conical baffle 28 in each section.

*Example 1*

There will now be described the use of the embodiment shown in FIG. 12 in which soap that is rich in glycerine may be washed with a solution of suitable electrolyte such as brine. The figure shows a 10-stage unit, built for a throughput of 3 tons of soap per hour, in which 1 denotes the rotors, 28 and 29 the conical plates, 5 the diffusers and 39 the stationary baffle system, while at 41 the lye leaves the unit. Such a unit, which may be extended easily to a 16-stage unit, is preferably built in a continuous soap plant, in which saponification and lye neutralization are also carried out continuosuly. The unit was built in such a way that the shaft with all 10 rotors could be vertically withdrawn from the unit. The shaft 4 which rotated at 130 r.p.m. was 60 mm. in diameter, and ran in only 2 bearings, a radial and axial roller bearing at the top and a cast iron bearing 49 at the bottom. This construction is suitable for units with up to 16 rotors.

The height and diameter of any of the intermediate sections were 340 mm. and 1100 mm., respectively. The slope of the conical plates was about 30°. The rotor possessed 8 projections of 50 mm. length each. The diameter of the rotor was 300 mm. The distance between the rotor and the diffuser was about 3 mm. The outer diameter of the diffuser was 670 mm. The stock in process was about 200–300 kgs. soap and 4000 kgs. wash liquor.

The crude soap was pumped to the washing unit by means of pump 40 at a predetermined rate in an even flow. The brine was fed in a constant predetermined compositon and heated to about 90° C.

The crude soap fed into the washing unit through inlet diffser 45 was preferably mixed with some lye in such a way that its anhydrous soap content was less than 57%. This was conveniently done by pumping lye by means of pump 56 from the bottom of the washing unit through a pipe 41 back into the bottom of the washing unit through the inlet diffuser 45 in the bottom section. By means of a separate pipe and pump 40, soap was introduced into the lye pipe, so that the soap lye mixture entered the bottom section of the washing unit through the lye circulation pipe 57 and the inlet diffuser 45.

The mixture of crude soap and lye entered the unit through the inlet diffuser 45. The soap separated from the lye and floated upwards under the conical plates, until it reached the rotor. The lye settled to the bottom and was partly pumped round to be mixed with the incoming soap in the lye pipe and partly taken out of the system as glycerine lye.

The rotor being a pump wheel, circulated the lye in section 1 continuously, the lye flowing to it through the narrow space between the conical baffles. The soap from the bottom section and the lye in section No. 1 were mixed in the rotor and the resulting "intimate mixture" of lye and soap was thrown out of the rotor against the diffuser and flowed then radially in a quiet fashion, into the separating space of section No. 1.

The soap floated upwards and passed into rotor No. 2. The lye flowed downwards and then upwards between the cones, partly into rotor No. 1 again, where it was mixed with fresh soap, and partly into the bottom section, to replace the outgoing glycerine lye, which was withdrawn from the lye circulation system.

All the intermediate sections of the washing unit were alike. The soap was settled in the top section and run off over a weir 46 and was drawn off through pipe 47. The fresh washing solution was introduced into this top section at a rate sufficient to replace the glycerine lye withdrawn from the bottom of the apparatus. The flow of the fresh washing solution was regulated by an interfacial float 44 at the washing liquor-soap interface, working a valve 43 in the washing solution supply pipe 42.

The composition of the lye-crude soap mixture entering the unit was such that the lye tending to separate from this soap, had an electrolyte concentration which had a similar salting out effect on the soap as the washing solution (see below). The temperature of the crude soap was preferably kept between about 85° C. to about 100° C.

The washing solution fed into the top of the washing unit consisted of water containing dissolved sodium chloride or sodium hydroxide or both. It was of course possible to use other electrolytes which salt out soap as well, provided that the required degree of salting out was obtained. The temperature range most suitable for the washing liquor in an open apparatus was from about 85 to about 102° C. and the soap appeared to be cleaned more easily at the higher temperatures than at the lower. Washing at temperatures well above 102° C. causes boiling of the lye unless the washing unit is kept under pressure. This could not be done in the unit to which this example refers. The normal working temperature chosen was therefore 95° C.

The proper functioning of the apparatus with a high glycerol extraction efficiency and a high throughput depends on the rapid partial separation of the lye from the soap after each mixing process. To ensure this, the electrolyte concentrations in the washing liquors had to be kept within certain limits. If sodium chloride was used as the electrolyte in the washing liquor, then the range of concentrations of sodium chloride which gave rapid separation when the washing liquor was intimately mixed with the soap varied with temperature, the values at the concentration range limits increased as temperature increased. These values depended also on the composition of the crude soap, such as the different proportions of the different component soaps with their differences in carbon chain length and degree of saturation.

For a tallow soap, rapid separation was obtained at 95° C. from sodium chloride solutions containing between 80 gms. and 95 gms. sodium chloride per liter. In such solutions part or all of the sodium chloride could be substituted by other electrolytes which salt out soap without reacting with it but for these not necessarily the same concentration was required to obtain rapid separation of soap and lye. For example sodium hydroxide could replace part of the sodium chloride, 1 g. sodium hydroxide being approximately equivalent to 1.4 gms. sodium chloride.

The yield of glycerol extracted from the soap by the washing solution depends primarily on the number of washing stages, the relation between the flow of soap and the flow of washing solution through the apparatus, and the ratio:

Glycerol concentration in the soap leaving any section

Glycerol concentration in the washing solution leaving the same section

This ratio is conveniently called "$k$."

In practice it was found that the value of the ratio "$k$" was more or less independent of the actual glycerol concentration of the washing solution in any section of the throughput and of the ratio between the amount of soap flowing through any section and the amount of washing solution leaving the same section.

It was, however, found to be dependent upon the rotor speed. Measurements were made on a 3 stage unit of similar design to the 10 stage unit already described with only that difference that 7 intermediate stages were missing. The "$k$" values calculated from these measurements showed that as the rotor speed was increased up to 130 r.p.m. the ratio "$k$" decreased. At speeds over 130 r.p.m. the rate of throughput of soap through the unit decreased sharply, probably because the movements created in the liquid in the "quiet zone" of the apparatus at the higher rotor speed, interfere with the separation of the soap and lye.

| Rotor speed, r.p.m.: | "$k$" |
|---|---|
| 62 | 0.67 |
| 80 | 0.59 |
| 100 | 0.49 |
| 130 | 0.41 |

These figures show that at 130 r.p.m., the "$k$" values obtained are as good, or nearly as good, as would be expected if equilibrium had been established between the soap and the lye in the mixing device.

*Example 2*

In a soapery, glycerine lyes are produced which often contain a certain amount of alkali in the form of dissolved sodium hydroxide and carbonate. This alkali must normally be neutralized before crude glycerine can be recovered from these lyes. This neutralization can be carried out by means of acid oils or fatty acids, or fatty oils containing free fatty acids or by means of mineral acids. In general the use of the fatty material for neutralizing the alkali in lye has the advantage over the use of mineral acid in that alkali is not merely neutralized, but is used instead of fresh alkali to make soap.

The apparatus of the invention has been used to neutralize the dissolved sodium hydroxide in soapery glycerine lyes using fatty oils containing some portion of free fatty acids as the neutralizing agent. By carrying out the process countercurrently it was possible to obtain as products glycerine lye containing only a trace of sodium hydroxide and soap containing only a trace of unsaponified saponifiable matter, and in color and quality comparable to soap made by the saponification of the same fatty oils with a fresh solution of caustic soda.

The apparatus is shown in FIG. 13, and was similar in construction to the apparatus described in Example 1. It was made of 9 similar sections, and a special top and bottom. The internal diameter of the sections was 1300 mm., and the height 500 mm. The slope of the conical plates was about 40°. The diameter of the rotors was 400 mm., and their speed of rotation 130–160 r.p.m. The outer diameter of the diffuser was 850 mm.

Lye was withdrawn from the next lowest section and pumped through a circulation pipe 52 into the bottom of the apparatus through an internal diffuser 45. Into this circulation pipe, fatty oil was introduced from inlet feed pipe 50, so that the liquid entering the apparatus at the bottom was a mixture of oil and lye—partly reacted. The lye separating from this mixture settled out in the bottom of the apparatus and could be withdrawn at a desired rate through pipe 58. The oil, together with entrained and emulsified lye floated upwards into the first rotor and then found its way up to the top of the apparatus in a similar way to the soap in example number 1, finally running off over the weir 46 in the top section of the apparatus.

The quantity of oil fed to the apparatus could be varied, and was regulated in such a way that the lye leaving the apparatus contained a predetermined concentration of alkali.

Lye to be neutralized was fed into the top section, the rate of flow being regulated by a valve 43 in the lye pipe 42, operated by an interfacial float 44 lying at the lye-soap interface.

The temperature of the alkaline glycerine lyes fed to the apparatus was usually in the range from about 95° C.

to about 102° C., and the lyes contained up to 30 gms. sodium hydroxide per liter, from about 80 to about 100 gms. sodium chloride per liter, as well as small quantities of sodium carbonate and other organic and inorganic matter.

The oil used for neutralization could be any of a number of fatty oils used in soap making. The oil used was liquid at 70° C. at which temperature it was introduced into the apparatus. It was preferable for the oil to have a free fatty acid content of at least 15%, although the apparatus functioned with oils of even lower free fatty acid content.

The throughput which can be handled in the apparatus depended to a large extent on the nature of the emulsion, which was formed when the oil was introduced into the lye circulation pipe, and which flowed into the bottom of the apparatus through the diffuser. If these emulsions broke down rapidly and separated a large part of their lye content, relatively high throughput rates were obtained. If the lye emulsified in the oil separated from the emulsion only very slowly or to only a small extent relatively small throughputs were obtained.

The saponified oil left the apparatus as soap, and it was found necessary that the oil chosen for neutralization gave a soap which was salted out under the conditions in the apparatus. For example coconut oil was not suitable for neutralizing lyes containing up to 30 gms. sodium hydroxide per liter, and 80 gms. sodium chloride per liter as the main electrolyte. For such lyes, however, tallow or palm oil could be satisfactorily used.

It was found possible to saponify the oil almost completely in its passage through the apparatus. At 156 r.p.m. rotor speed, using an oil consisting of tallow containing from 15% to 20% free fatty acids to neutralize the sodium hydroxide in a lye containing from about 25 to about 30 gms. sodium hydroxide per liter and from about 80 to about 90 gms. sodium chloride per liter, the products obtained were soap containing about 0.5% unsaponified saponifiable matter, and lye containing 0.04% sodium hydroxide. The rate of lye throughput was more than 2500 liters per hour. At higher throughput rates there was a tendency for some partly saponified oil to leave the apparatus entrained in the outgoing lye.

The embodiment shown in FIG. 14 is similar to that shown in FIG. 9 except that, in addition, two cylindrical baffles are used. The inner cylindrical baffle 53 is joined at its upper end to the upper end of the lower conical baffle 28, so as to prevent material from passing between these two components. The outer cylindrical baffle 54 has its upper end below the upper end of the inner cylindrical baffle 53 and above the lower end of that baffle. The upper end of cylindrical baffle 54 is so spaced from the lower cone 28 that the material passes freely between the cylindrical baffle 54 and conical baffle 28, over the upper end of cylindrical baffle 54 and below the lower end of cylindrical baffle 53. This cylindrical baffle system is essential in all cases when maximum efficiency is desired as against the cases when a high throughput of the continuous phase is desired.

The light phase entering through pipe 23 is spread out by means of a flat circular baffle 55.

As many and varied modifications of the subject matter of this invention will become apparent to those skilled in the art from the detailed description given herein, it is to be understood that this invention is to be limited only in accordance with the appended claims.

We claim:

1. Apparatus for sequentially mixing and separating two phases of different density which are immiscible or only slightly miscible, comprising a container; inlet and outlet means to the container for said phases of different densities; a rotor mounted in the container and comprising a rotatable shaft, a plate mounted on the shaft, a plurality of radial vanes mounted on the plate; means for simultaneously directing at least portions of the two phases of different density to the rotor including baffle means connected to the container and forming a partition extending to the vicinity of the rotor so as to separate the inlets for the phases of different density; and a stationary diffuser mounted in the container, co-planar with the rotor, and comprising a stationary annular plate having a plurality of vanes spaced radially outwardly from the rotor arranged to change the flow from the rotor from a tangential flow to a radial flow.

2. The apparatus of claim 1 wherein the baffle means comprise at least one conical baffle disposed within the container.

3. Apparatus according to claim 2 in which the surface of said conical baffle forms an angle of from about 100° to about 150° with the axis of said rotor, said conical baffle and at least one fluid inlet being arranged to direct at least a portion of the incoming fluids through the narrow portions of said conical baffle into said rotor.

4. Apparatus according to claim 2 wherein said baffle means comprises at least one conical baffle arranged whereby the narrow end of said at least one baffle is adjacent the suction side of said rotor.

5. Apparatus according to claim 1 wherein the simultaneous directing means includes an inlet pipe projecting into the container and extending into the vicinity of the rotor.

References Cited by the Examiner

UNITED STATES PATENTS

| | | | |
|---|---|---|---|
| 2,413,375 | 12/1946 | Pomeroy | 259—8 |
| 2,566,555 | 9/1951 | Coulter et al. | 259—96 X |
| 2,615,697 | 10/1952 | Valentine | 259—96 X |
| 2,963,281 | 12/1960 | Reiffen | 259—96 X |
| 3,050,188 | 8/1962 | Nisser et al. | 259—96 X |

WALTER A. SCHEEL, *Primary Examiner.*